(12) United States Patent
Singh et al.

(10) Patent No.: US 10,756,558 B2
(45) Date of Patent: Aug. 25, 2020

(54) ESTABLISHING TRUSTED RELATIONSHIPS FOR MULTIMODAL WIRELESS POWER TRANSFER

(71) Applicant: Integrated Device Technology, Inc., San Jose, CA (US)

(72) Inventors: Manjit Singh, Fremont, CA (US); Jianbin Hao, San Jose, CA (US); Zhuyan Shao, San Jose, CA (US); Christopher Stephens, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 15/604,466

(22) Filed: May 24, 2017

(65) Prior Publication Data

US 2017/0256980 A1 Sep. 7, 2017

Related U.S. Application Data

(63) Continuation-in-part of application No. 13/434,658, filed on Mar. 29, 2012.
(Continued)

(51) Int. Cl.
*H02J 7/02* (2016.01)
*H02J 50/12* (2016.01)
*H02J 50/80* (2016.01)

(52) U.S. Cl.
CPC .............. *H02J 7/025* (2013.01); *H02J 50/12* (2016.02); *H02J 50/80* (2016.02)

(58) Field of Classification Search
None
See application file for complete search history.

(56) References Cited

U.S. PATENT DOCUMENTS

| 4,953,068 A | 8/1990 | Henze |
| 9,269,333 B2 | 2/2016 | Yu |

(Continued)

FOREIGN PATENT DOCUMENTS

WO 2012013129 10/2013

OTHER PUBLICATIONS

International Search Report for PCT Application No. PCT/US2017/034549 Issued by the U.S. International Searching Authority dated Aug. 7, 2017; pp. 1-2.
(Continued)

*Primary Examiner* — Robert Grant
*Assistant Examiner* — Tynese V McDaniel
(74) *Attorney, Agent, or Firm* — Haynes and Boone, LLP

(57) ABSTRACT

In accordance with aspects of the present invention, a first wireless power enabled device includes a transceiver and control logic. The transceiver includes a plurality of switches coupled in a full-bridge configuration with a resonant tank circuit. The control logic is configured to detect a presence of a second wireless power enabled device, establish a trusted relationship with the second wireless power enabled device, determine an operating mode of the first wireless power enabled device selected from a transmit mode or a receive mode, and drive the plurality of switches to operate the resonant tank circuit in the determined operating mode. The first wireless power enabled device may further include a memory that stores a copy of a first key associated with the first wireless power enabled device and a copy of a second key associated with the second wireless power enabled device.

19 Claims, 7 Drawing Sheets

Related U.S. Application Data

(60) Provisional application No. 62/341,581, filed on May 25, 2016, provisional application No. 62/341,553, filed on May 25, 2016.

(56) References Cited

U.S. PATENT DOCUMENTS

| | | | |
|---|---|---|---|
| 9,343,929 B2 | 5/2016 | Sankar et al. | |
| 2003/0172268 A1* | 9/2003 | Walmsley | H04L 9/3271 |
| | | | 713/168 |
| 2006/0280297 A1* | 12/2006 | Fukaya | H04L 9/0833 |
| | | | 380/28 |
| 2008/0089519 A1* | 4/2008 | Ekberg | H04W 12/04 |
| | | | 380/270 |
| 2008/0231211 A1 | 9/2008 | Baarman et al. | |
| 2009/0261778 A1 | 10/2009 | Kook | |
| 2010/0084918 A1 | 4/2010 | Fells et al. | |
| 2010/0148723 A1 | 6/2010 | Cook et al. | |
| 2010/0174909 A1* | 7/2010 | Ashdown | H04L 9/0891 |
| | | | 713/171 |
| 2010/0225270 A1* | 9/2010 | Jacobs | H02J 5/005 |
| | | | 320/108 |
| 2011/0018356 A1* | 1/2011 | Chatterjee | H02J 5/005 |
| | | | 307/104 |
| 2011/0254377 A1 | 10/2011 | Wildmer et al. | |
| 2012/0043887 A1 | 2/2012 | Mesibov | |
| 2012/0119569 A1 | 5/2012 | Karalis et al. | |
| 2012/0119698 A1 | 5/2012 | Karalis et al. | |
| 2012/0184338 A1 | 7/2012 | Kesler et al. | |
| 2013/0026981 A1* | 1/2013 | Van Der Lee | H02J 5/005 |
| | | | 320/108 |
| 2013/0127687 A1 | 5/2013 | Yu | |
| 2013/0147280 A1 | 6/2013 | Oettinger | |
| 2013/0257360 A1 | 10/2013 | Singh | |

OTHER PUBLICATIONS

Written Opinion for PCT Application No. PCT/US2017/034549 Issued by the U.S. International Searching Authority dated Aug. 7, 2017; pp. 1-6.

* cited by examiner

ESTABLISHING TRUSTED RELATIONSHIPS FOR MULTIMODAL WIRELESS POWER TRANSFER

RELATED APPLICATIONS

The present application is a continuation-in-part of U.S. application Ser. No. 13/434,658, filed Mar. 29, 2012, entitled "Apparatuses Having Different Modes of Operation for Inductive Wireless Power Transfer and Related Method," claims priority to U.S. Patent Application 62/341,581, filed on May 25, 2016, entitled "Two-Way Secured Authentication for Wireless Power," and claims priority to U.S. Patent Application 62/341,553, filed on May 25, 2016, entitled "Two-Way Secured Authentication for Wireless Power," each of which is incorporated herein by reference in their entirety.

TECHNICAL FIELD

Embodiments of the present disclosure relate generally to inductive wireless power transfer and, more particularly, to apparatuses and related method for establishing trusted relationships for multimodal inductive wireless power transfer.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coil is one method considered as an un-tethered method for transferring power wirelessly through a coupled electromagnetic field. In inductive wireless power transmission, power is transferred by transmitting an electromagnetic field through a transmit coil. On the receiver side, a receiver coil may couple with the transmit coil through the electromagnetic field, thus, receiving the transmitted power wirelessly. The distance between the transmitter and receiver coils at which efficient energy transfer can take place, is a function of a coupling coefficient between the coils. The coupling efficiency may be significantly improved if the coils are sized and operated at such a frequency that they are physically within the so-called "near-field zone" of each other.

SUMMARY

Embodiments of the present disclosure include an inductive wireless power enabled device. The inductive wireless power enabled device comprises a transceiver including a plurality of switches coupled with a resonant tank, and control logic configured to drive the plurality of switches to operate the resonant tank in one of a transmit mode and a receive mode.

Another embodiment of the present disclosure includes an inductive wireless power enabled device. The inductive wireless power enabled device comprises a transceiver including a plurality of switches coupled with a resonant tank. The transceiver is configured to both transmit a wireless power signal through the resonant tank and generate power from an incoming wireless power signal through the resonant tank depending on a current operational mode.

Another embodiment of the present disclosure includes a method for operating a wireless power enabled device. The method comprises determining a mode of operation for a wireless power enabled device from among a transmit mode and a receive mode, transmitting a wireless power signal through a resonant tank of the wireless power enabled device during the transmit mode, and generating an output power responsive to receiving an incoming wireless power signal through the resonant tank of the wireless power enabled device during the receive mode.

In accordance with aspects of the present invention, a first wireless power enabled device includes a transceiver and control logic. The transceiver includes a plurality of switches coupled in a full-bridge configuration with a resonant tank circuit. The control logic is configured to detect a presence of a second wireless power enabled device, establish a trusted relationship with the second wireless power enabled device, determine an operating mode of the first wireless power enabled device selected from a transmit mode or a receive mode, and drive the plurality of switches to operate the resonant tank circuit in the determined operating mode.

In accordance with aspects of the present invention, a method includes determining an operating mode of a first wireless power enabled device, establishing a trusted relationship between the first wireless power enabled device and a second wireless power enabled device, and when the determined operating mode is a receive mode, driving the plurality of switches to generate a wireless power signal that transmits power to the second wireless power enabled device. The first wireless power enabled device includes a plurality of switches coupled in a full-bridge configuration with a resonant tank circuit. The operating mode is selected from the receive mode and a transmit mode.

In accordance with aspects of the present invention, a first wireless power enabled device includes a transceiver including a plurality of switches coupled in a full-bridge configuration with a resonant tank circuit, a secure storage that includes copies of two or more digital keys; and control logic. The control logic is configured to detect a presence of a second wireless power enabled device, authenticate the second wireless power enabled device using the two or more digital keys, negotiate with the authenticated second wireless power enabled device to determine an operating mode of the first wireless power enabled device, and drive the plurality of switches to operate the resonant tank circuit in the determined operating mode. The operating mode being selected from a transmit mode or a receive mode.

These and other embodiments are further discussed below with respect to the following figures.

DETAILED DESCRIPTION

Figure 1:
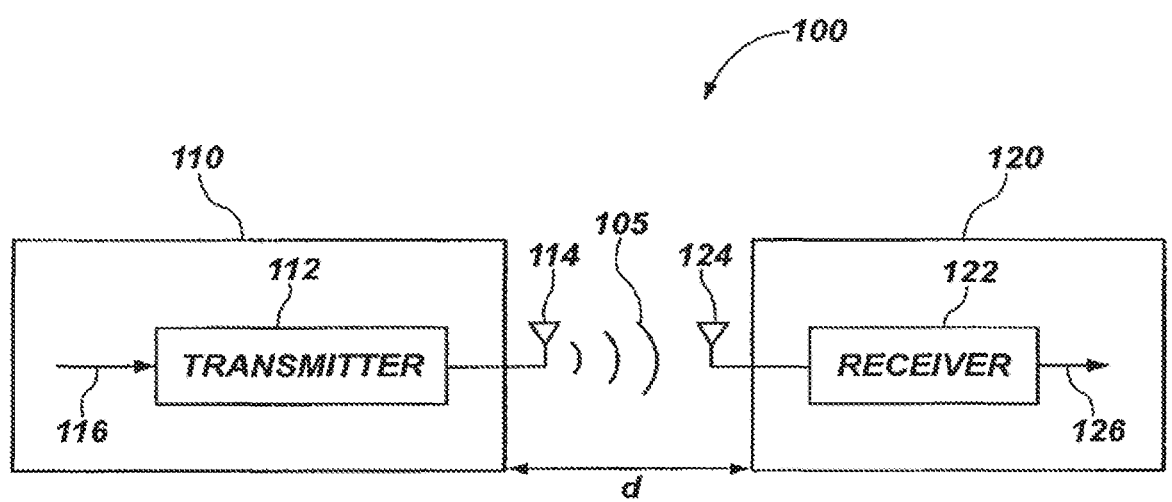
FIG. 1 is a schematic block diagram of an inductive wireless power transfer system according to some embodiments.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

FIG. 1 is a schematic block diagram of an inductive wireless power transfer system 100. The inductive wireless power transfer system 100 includes a wireless power transmitting apparatus 110, and a wireless power receiving apparatus 120. The wireless power transmitting apparatus 110 includes a transmitter 112 having a transmit coil 114 configured to generate an electromagnetic field 105 for providing energy transfer to the wireless power receiving apparatus 120. The wireless power receiving apparatus 120 includes a receiver 122 having a receive coil 124 configured to couple with the electromagnetic field 105. The transmit coil 114 and the receive coil 124 may be sized according to the particular devices and applications to be associated therewith. The electromagnetic field 105 may also be referred to as the wireless power signal 105 for energy transfer from the transmitter 112 to the receiver 122.

An input signal 116 may be provided to the transmitter 112 for providing the transmitter 112 with the power for generating the wireless power signal 105 that provides an energy transfer to the wireless power receiving apparatus 120. The receiver 122 may couple to the wireless power signal 105 and generates an output signal 126 in response thereto. The output signal 126 may provide the power that is used by the wireless power receiving apparatus 120 for storing (e.g., charging a battery), consumption (e.g., providing system power), or both.

The transmitter 112 and the receiver 122 are separated by a distance (d). In some embodiments, the transmitter 112 and the receiver 122 may be configured according to a mutual inductance relationship, such that when the resonant frequency of the receiver 122 and the resonant frequency of the transmitter 112 are substantially identical, transmission losses between the transmitter 112 and the receiver 122 are minimal. Likewise, the frequency of the wireless power signal 105 may be set by the transmitter 112 at or near the resonant frequencies of the coils 114, 124. As a result, an efficient energy transfer occurs by coupling a large portion of the energy in the near-field of the transmit coil 114 to the receive coil 124 rather than propagating most of the energy in an electromagnetic wave to the far-field. If the wireless power receiving apparatus 120 is in the near-field, inductive coupling may occur between the transmit coil 114 and the receive coil 124. The area around the transmit coil 114 and receive coil 124 where this near-field inductive coupling may occur may be referred to as a "coupling region."

The desired distance (d) separating the transmitter 112 and the receiver 122 may be a standard distance (e.g., 2 mm) that is determined by the Wireless Power Consortium (WPC). In some embodiments, the transmit coil 114 and the receive coil 124 may include magnetically attractive elements that assist in ensuring that the transmitter 112 and the receiver 122 remain at a known fixed distance (e.g., 2 mm) during wireless power transfer. In other words, employing a magnetically-guided topology that aligns the transmitter 112 and the receiver 122 may ensure that the transmitter 112 and the receiver 122 align within a relatively tight fixed vertical distance. For example, the transmitter 112 may include a magnet, while the receiver 122 may include an attractor (or vice versa).

The transmit coil 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power transmitting apparatus 110 may be a wireless power charger. The wireless power receiving apparatus 120 may be a mobile electronic device, such as a cell phone, smart phone, media player (e.g., mp3 player, DVD player, etc.), electronic reader, tablet computer, personal digital assistant (PDA), camera, laptop computer, and personal electronic device in which wireless power may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode.

Figure 2:
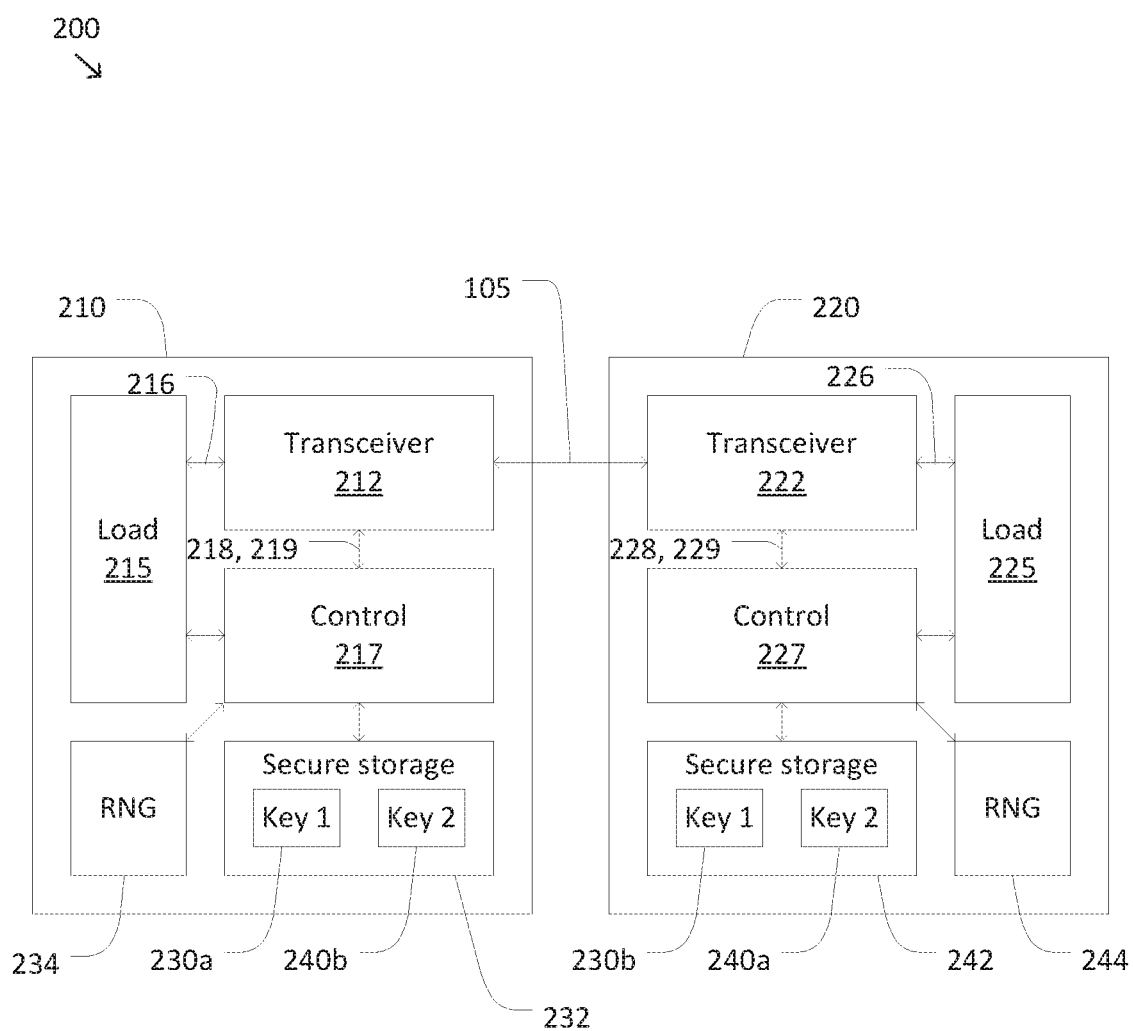
FIG. 2 is a schematic block diagram of an inductive wireless power transfer system according to an embodiment of the present disclosure.

FIG. 2 is a schematic block diagram of an inductive wireless power transfer system 200 according to some embodiments of the present disclosure. The inductive wireless power transfer system 200 includes a first wireless power enabled device 210 and a second wireless power enabled device 220. The first wireless power enabled device 210 may include a wireless charging transceiver 212, a load 215, and control logic 217. Similarly, the second wireless power enabled device 220 may include a wireless charging transceiver 222, a load 225, and control logic 227.

The first wireless power enabled device 210 and the second wireless power enabled device 220 may each be configured to either transmit or receive the wireless power signal 105 depending on its mode of operation. For example, the first wireless power enabled device 210 may be configured to have a transmit mode and a receive mode. In the transmit mode, the first wireless power enabled device 210 may generate the wireless power signal 105 for energy transfer to another device. In the receive mode, the first wireless power enabled device 210 may receive the wireless power signal 105 and generate an output power signal 216 for a load 215. Likewise, the second wireless power enabled device 220 may be configured to have a transmit mode and a receive mode. In the transmit mode, the second wireless power enabled device 220 may generate the wireless power signal 105 for energy transfer another device. In the receive mode, the second wireless power enabled device 220 may receive the wireless power signal 105 and generate an output power signal 226 for a load 225. The control logic 217, 227 may be configured to determine which mode of operation the respective wireless power enabled device 210, 220 is desired to operate in. The control signals 218, 219, 228, 229 may be transmitted to the wireless charging transceivers 212, 222 to drive the desired operations.

As an example, the control logic 217, 227 may include a processor (e.g., microcontroller) that is configured (e.g., programmed) to determine whether the respective wireless charging transceiver 212, 222 is to operate in transmit mode or receive mode. The control logic 217, 227 may further include computer-readable media (e.g., memory) storing computing instructions for execution by the processor related to performing processes of the embodiments of the present disclosure. Memory may include volatile and non-volatile memory. The loads 215, 225 may include energy storage devices (e.g., batteries), system components of the wireless power enabled devices 210, 220, or both. Thus, the output power signals 216, 226 may be a charging signal for an energy storage device, or a system power signal for the various system components.

Because each of the wireless power enabled devices 210, 220 may be configured for either transmitting or receiving power, the wireless power enabled devices 210, 220 may be configured for wireless power "charging on the go" (OTG charging). For example, each of the wireless power enabled devices 210, 220 may be an electronic device (e.g., cell phone, tablet, laptop, etc.) that may provide power to, or receive power from, another electronic device (e.g., cell phone, tablet, laptop, etc.). Of course, a wireless power enabled device that is configured for OTG charging may inductively couple with wireless power devices that are only configured for one-way charging. For example, the first wireless power enabled device 210 may operate in receive mode to receive the wireless power signal 105 generated from a wireless power transmitting apparatus that only operates in a transmit mode. Likewise, the first wireless power enabled device 210 may operate in transmit mode to generate the wireless power signal 105 for reception from a wireless power receiving apparatus that only operates in a receive mode.

In operation, each of the control logic 217, 227 determines which mode of operation the respective wireless power enabled device 210, 220 is desired to operate in. This determination may be performed according to a protocol that determines which wireless power enabled device 210, 220 is to operate in transmit mode and which is to operate in receive mode. In other words, the control logic 217, 227 determines the relationship between the wireless power enabled devices 210, 220. For example, the first wireless power enabled device 210 may include a software application that a user may interface with to manually establish the relationship between the first wireless power enabled device 210 and a nearby second wireless power enabled device 220. The first wireless power enabled device 210 may establish a communication link with the second wireless power enabled device 220 to establish the desired relationship. In another embodiment, the user may set (e.g., with a software application, a physical switch, etc.) the first wireless power enabled device 210 to operate in transmit mode, which then generates the wireless power signal 105. The second wireless power enabled device 220 may simply detect the presence of the wireless power signal 105 and automatically enter receive mode. As a result, a communication link between the wireless power enabled devices 210, 220 may not need to be established. In some embodiments, the wireless power enabled devices 210, 220 may further include a negotiation protocol that automatically establishes a desired relationship responsive to detecting each other's presence. For example, a negotiation protocol may be set to determine that the wireless power enabled device 210, 220 that has the higher remaining battery charge should operate in transmit mode. Other applications, features, and protocols for manually and automatically establishing a relationship between the wireless power enabled devices 210, 220 are also contemplated.

In some examples, it may be desirable to establish a trusted relationship between wireless power enabled devices 210 and 220. The trusted relationship may be authenticated prior to and/or during data communication and/or wireless power transfer between wireless power enabled devices 210 and 220. Establishing a trusted relationship between wireless power enabled devices 210 and 220 has a variety of applications, including privacy, security, and/or business applications. For example, the trusted relationship may serve to protect personal information and/or other information of a private nature that is shared between wireless power enabled devices 210 and 220 during the negotiation protocol, including but not limited to battery charge state information and/or device identifiers.

In some examples, the trusted relationship between wireless power enabled devices 210 and 220 may be used to mitigate security risks associated with inductive wireless power transfer system 200. For example, the trusted relationship may ensure that the negotiation protocol between wireless power enabled devices 210 and 220 proceeds fairly when determining which device should operate in transmit mode and which should operate in receive mode. Consistent with such examples, the trusted relationship may mitigate the risk of an untrusted device falsely indicating that it is low on battery charge in order to be selected as the power receiver, even when it would otherwise be selected as the power transmitter. In this regard, trusted relationships may be used to prevent theft of electrical charge stored by wireless power enabled devices 210 and 220. In some examples, the trusted relationship may be used to prevent and/or reduce risks associated with digital hacking and/or other malicious attacks, such as an attack designed to physically damage a target device by transferring and/or receiving power beyond the rating of the target device. In some examples, the trusted relationship may be used to protect against non-malicious security risks, such as a risk of physical damage based on non-compatibility between untrusted devices (e.g., frequency mismatch, different limits on power transfer rates and/or capacity, different units of battery charge, and/or the like).

In some examples, trusted relationships may be used to establish a closed ecosystem of devices that are capable of exchanging power wirelessly. For example, a set of wireless power enabled devices, such as wireless power enabled devices 210 and 220, may have trusted relationships among themselves to collectively share their battery charge with each other. Untrusted devices may be excluded from the shared charging pool. An exemplary set of wireless power enabled devices in a shared charging pool may include a laptop computer, a tablet computer, a smart phone, and a watch belonging to a single user and/or group of affiliated users. On a given outing, the user may use the smart phone and the watch more than the laptop and tablet, in which case the user's laptop and tablet may serve as wireless power transmitters to maintain the charge levels of the phone and watch. In this scenario, however, the user desires to prevent the laptop and tablet from transmitting power to any devices outside of the shared charging pool, such as an electronic device belonging to a stranger. Accordingly, the trusted relationships may ensure that battery charge is not transmitted outside of the shared pool of authorized devices. In some embodiments, the trusted relationships may be used to securely identify transmitting and/or receiving devices for billing and/or logging purposes, such as to identify and toll users of a battery charging network based on their usage.

In some examples, the trusted relationship may be used in the negotiation protocol between wireless power enabled devices 210 and 220 when determining which device should operate in transmit mode and which should operate in receive mode. For example, one or more conditions of the trusted relationship may directly specify which of wireless power enabled devices 210 and 220 is the transmitter and which is the receiver. In some examples, conditions of the trusted relationship may specify information that indirectly factors into the outcome of the negotiation protocol, such as an authorized monthly charging quota and/or the like.

A variety of techniques may be used to establish the trusted relationship between wireless power enabled devices 210 and 220. In some examples, the trusted relationship may be established based on user-provided information (e.g., passwords, biometric information, and/or the like) and/or device information (e.g., stored keys, identifiers, configuration information, and/or the like). Examples of techniques for establishing the trusted relationship include cryptographic techniques such as RSA, public key infrastructure techniques, challenge-response authentication, and/or the like.

In the illustrative embodiment depicted in FIG. 2, a key-based technique for authentication is depicted in which each of wireless power enabled devices 210 and 220 stores a pair of keys. The first key is associated with wireless power enabled device 210, and the second key is associated with wireless power enabled device 220. Wireless power enabled device 210 stores a copy of a first key 230$a$ and a copy of a second key 240$b$, and wireless power enabled device 220 stores a copy of the first key 230$b$ and a copy of the second key 240$a$. In some examples, wireless power enabled devices 210 and 220 may store additional keys associated with other devices (not shown) with which trusted relationships may have been established (e.g., other devices in a shared pool of trusted devices). In some examples, the first and second keys may include binary vectors with N elements each, where N is selected to provide the desired level of security in the trusted relationship. For example, N may be greater than 80 (e.g., 128). The pair of keys may be randomly generated and/or may be selected using cryptographic techniques. In some examples, one or more of key copies may be stored in secure storage 232 and/or 242. Secure storage 232 and/or 242 may include physical and/or digital security features (e.g., encryption, password protection, and/or the like) to protect the key from physical tampering, digital tampering, theft, and/or the like.

During authentication, a device seeking to authenticate another device may verify that the other device possesses each of the first and second keys. For example, wireless power enabled device 210 may verify that wireless power enabled device 220 is in possession of the first and second keys prior to transferring power to and/or receiving power from wireless power enabled device 220. During mutual authentication, wireless power enabled device 220 may likewise verify that wireless power enabled device 210 is in possession of the first and second keys. Examples of techniques for performing one-way and/or mutual authentication using a key pair are discussed in greater detail below with reference to FIGS. 4-5. Some examples of authentication processes may use one or more random and/or pseudo random numbers for security purposes. Accordingly, wireless power enabled devices 210 and/or 220 may include random number generator modules 234 and 244, respectively.

Figure 3A:
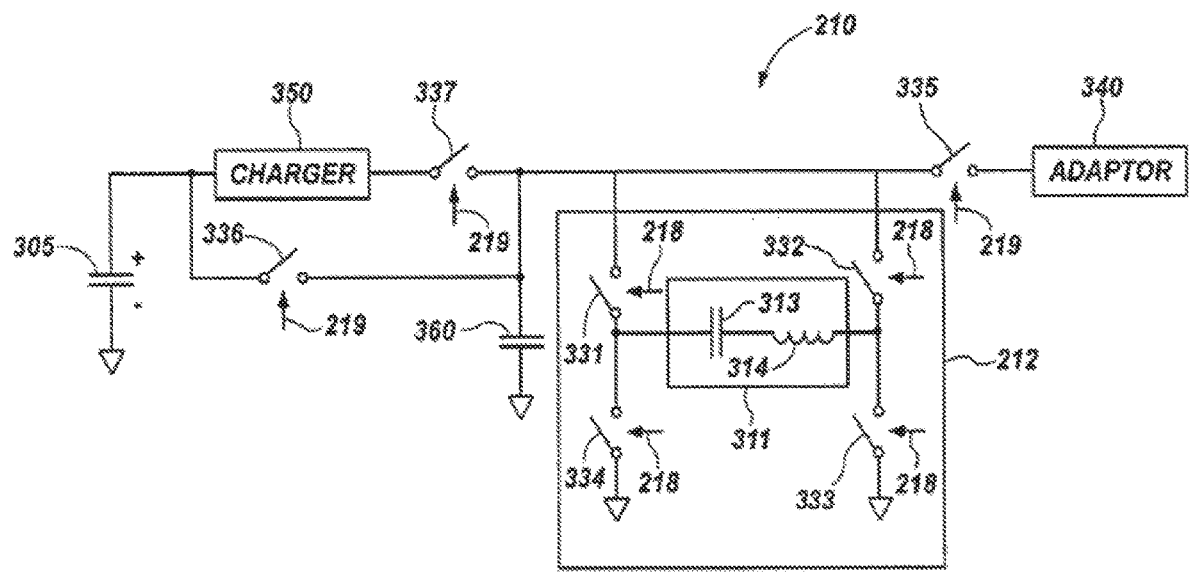
FIGS. 3A through 3D are schematic diagrams of a wireless power enabled device according to an embodiment of the present disclosure.

FIGS. 3A through 3D are schematic diagrams of a wireless power enabled device 210 according to an embodiment of the present disclosure. In particular, FIG. 3A shows a general configuration of at least some of the various components that may be present in the wireless power enabled device 210, while FIGS. 3B through 3D demonstrate the operation of the wireless power enabled device 210 for different modes of operation. The wireless power enabled device may be the first wireless power enabled device 210 of FIG. 2; however, it should be understood that the description and operation related to FIGS. 3A through 3D may apply to the second wireless power enabled device 220 as well.

Referring specifically to FIG. 3A, the wireless power enabled device 210 may include a wireless charging transceiver 212 that is coupled to an energy storage device 305. As discussed above, the energy storage device 305 may be included as part of the load 215 (FIG. 2) that receives the power from the wireless energy transfer. The wireless charging transceiver 212 may provide power to the energy storage device 305 through a charger 350 during receive mode. Although not specifically shown in FIGS. 3A through 3D, it is recognized that other system components of the wireless power enabled device 210 may receive power from the wireless charging transceiver 212, and that a path for system power may also be provided. The wireless charging transceiver 212 may receive power from the energy storage device 305 through the path parallel to the charger 350 to generate the wireless power signal 105 (FIG. 2) during transmit mode. In some embodiments, the wireless power enabled device 210 may receive power through non-wireless methods, such as being coupled with an adaptor 340 that may be plugged in to a traditional AC outlet. A plurality of switches 335, 336, 337 are coupled with the wireless charging transceiver 212 to control the power flow for the appropriate mode of operation. The plurality of switches 335, 336, 337 may be controlled by control signals 219 from the control logic 217 (FIG. 2).

The wireless charging transceiver 212 includes a resonant tank 311 that includes a capacitor 313 and an inductive coil 314. The capacitor 313 and inductive coil 314 may be configured in an LC network, such as being coupled in series (as shown) or in parallel. Additional capacitors and inductive coils may be included within the LC network of the resonant tank 311. The resonant frequency of the resonant tank 311 may be based on the inductance of the inductive coil 314 and the capacitance of the plates of the capacitor 313. If the resonant frequencies of the resonant tank 311 is substantially the same as the other inductively coupled device, the coupling efficiency and wireless power transfer may be improved.

The wireless charging transceiver 212 may include a plurality of switches 331, 332, 333, 334 that are controllable by the control signals 218 from the control logic 217 (FIG. 2). Thus, the control logic 217 may control the operation of the plurality of switches 331, 332, 333, 334 to operate in either a transmit mode or a receive mode. As a result, the inductive coil 314 may act as either a transmit coil or a receive coil depending on the mode of operation of the wireless power enabled device 210. Thus, during transmit mode, the wireless charging transceiver 212 may be configured to generate the wireless power signal 105 through the inductive coil 314 for providing energy transfer to a wireless power receiving apparatus. In receive mode, the wireless charging transceiver 212 may be configured to receive the wireless power signal 105 from a wireless power transmitting apparatus, such that a current is generated in the inductive coil 314 via inductive coupling.

The plurality of switches 331, 332, 333, 334 may be configured as a full-bridge circuit, such that the resonant tank 311 is coupled on one end at a node between the first switch 331 and the fourth switch 334, and at a node between the second switch 332 and the third switch 333 on the other end. In other words, the first switch 331 and the fourth switch 334 may be serially coupled having a first node therebetween, and the second switch 332 and the third switch 333 may be serially coupled having a second node therebetween. The resonant tank 311 may be coupled between the first node and the second node.

Figure 3B:
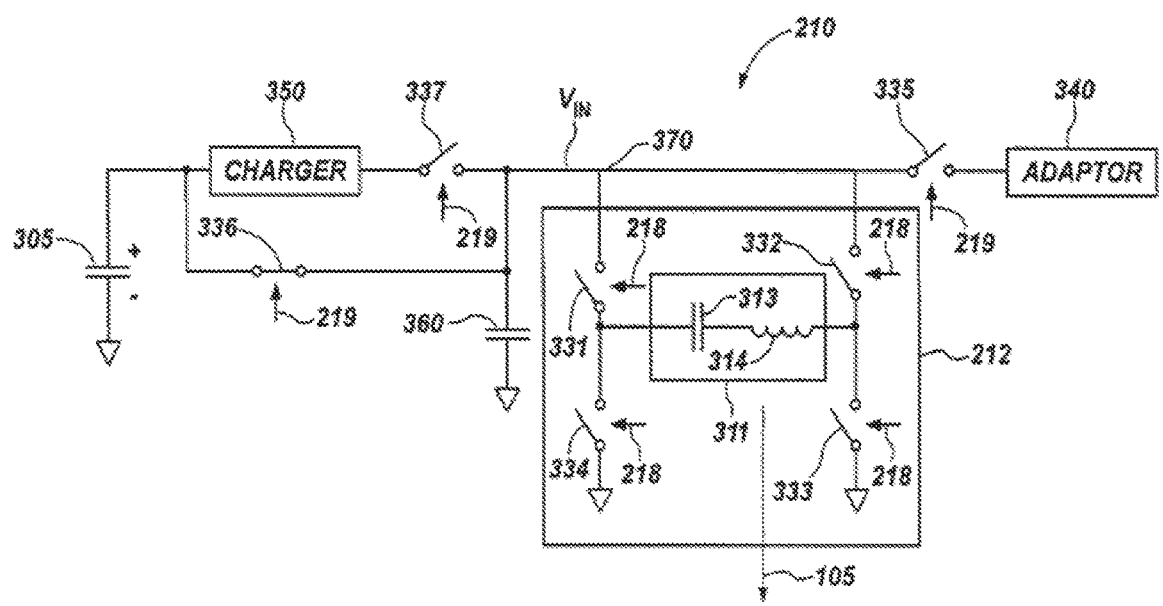

Referring now specifically to FIG. 3B, the wireless power enabled device 210 is shown as being operated in a transmit mode according to an embodiment of the present disclosure. In order to transmit wireless power, the control logic 217 (FIG. 2) may generate control signals 218 that operate the plurality of switches 331, 332, 333, 334 of the wireless charging transceiver 212 as a full-bridge inverter. As a result, the plurality of switches 331, 332, 333, 334 may open and close to generate an AC current through the resonant tank 311. For example, the control logic 217 may generate the control signals 218 to drive the plurality of switches 331, 332, 333, 334 to vary switching frequency, duty cycle of the switching, phase of the switching, the input voltage, or a combination thereof.

As a result, the AC current flowing through the resonant tank 311 may generate a time-varying electromagnetic field for transmitting the wireless power signal 105 to a wireless power receiving apparatus. Thus, the wireless power signal 105 may be a time-varying signal that is substantially sinusoidal, having a frequency based on the switching frequency of the wireless charging transceiver 212. The control logic 217 may control the plurality of switches 331, 332, 333, 334 to cause the wireless power signal 105 to have a frequency that is approximately the resonant frequency of the resonant tank 311. In some embodiments, the frequency of the wireless power signal 105 may differ from the resonant frequency of the resonant tank 311, such as to reduce the peak to peak current through the inductive coil 314.

In this example, the power used to generate the wireless charging signal can be provided by the energy storage device 305 rather than through the adaptor 340. Thus, the fifth switch 335 may be open to disconnect the wireless charging transceiver 212 from the adaptor 340, and the sixth switch 336 may be closed to connect the energy storage device 305 to the wireless charging transceiver 212. In addition, the seventh switch 337 may be opened so that current may not flow through the charger 350 to the energy storage device 305. As a result, the voltage at node 370 may be the input signal ($V_{IN}$) to the wireless charging transceiver 212 for enabling current flow through the resonant tank 311 to generate the wireless power signal 105. Capacitor 360 may be coupled to node 370 may act as an input capacitor during transmit mode.

Figure 3C:
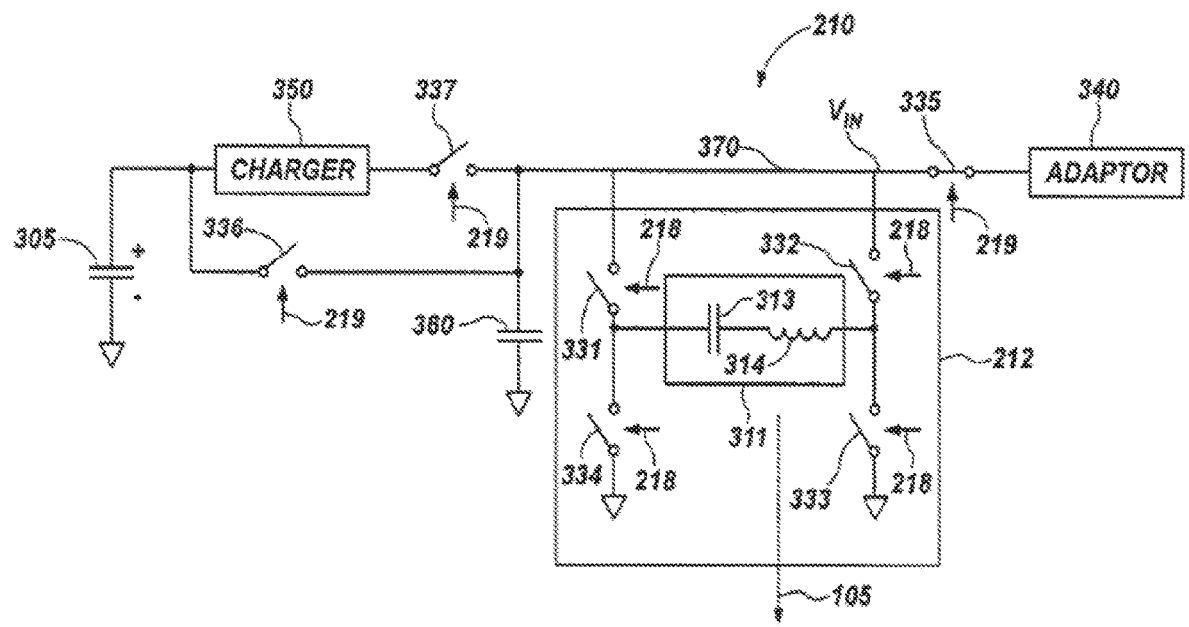

Referring specifically to FIG. 3C, the wireless power enabled device 210 is shown as being operated in a transmit mode according to another embodiment of the present disclosure. While in transmit mode, the control logic 217 (FIG. 2) and the wireless charging transceiver 212 may operate similar to that described with respect to FIG. 3B. In this example, however, the power used to generate the wireless charging signal is provided through the adaptor 340 rather than from the energy storage device 305 of the wireless power enabled device 210. For example, the wireless power enabled device 210 may be plugged into an AC outlet for receiving power while providing the wireless power signal 105 to another device. Thus, the fifth switch 335 may be closed to connect the wireless charging transceiver 212 and the adaptor 340, and the sixth switch 336 may be open to disconnect the energy storage device 305 to the wireless charging transceiver 212. In addition, the seventh switch 337 may be opened so that current may not flow through the charger 350 to the energy storage device 305. As a result, the voltage at node 370 may be the input signal ($V_{IN}$) to the wireless charging transceiver 212 for enabling current flow through the resonant tank 311 to generate the wireless power signal 105.

Figure 3D:
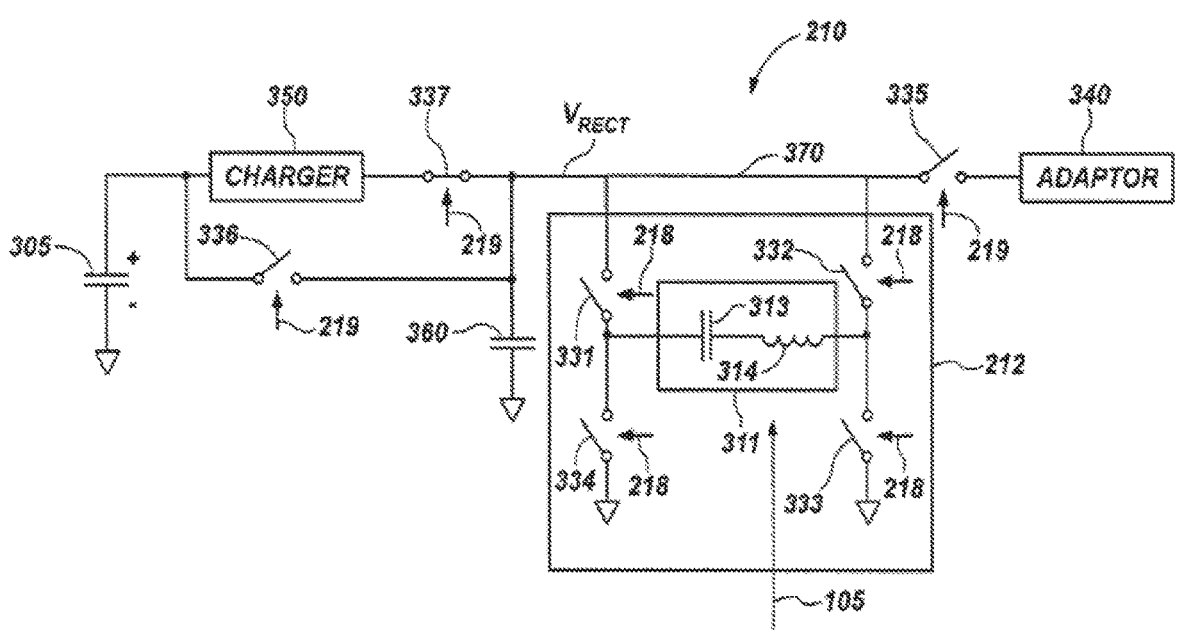

Referring specifically to FIG. 3D, the wireless power enabled device 210 is shown as being operated in a receive mode according to another embodiment of the present disclosure. In order to receive wireless power, the wireless power enabled device 210 may be placed in the coupling region of a wireless power transmitting apparatus such that inductive coupling may be achieved. As a result, the wireless charging transceiver 212 may receive the wireless power signal 105 and generate an AC current responsive thereto. In order for the power to be used by the wireless power enabled device 210, the AC current may be converted to a DC current. As a result, the control logic 217 (FIG. 2) may generate control signals 218 that operate the plurality of switches 331, 332, 333, 334 of the wireless charging transceiver 212 as a full-bridge rectifier. As a result, the plurality of switches 331, 332, 333, 334 may open and close to generate a DC current from the AC current flowing through the resonant tank 311. As a result, the voltage at node 370 is a rectified voltage ($V_{RECT}$) that is provided to the load 215 (FIG. 2), such as the energy storage device 305 (for charging), system components of the wireless power enabled device 210 (for system power), or a combination thereof.

The seventh switch 337 may be closed to connect the charger 350 and the wireless charging transceiver 212, such that power may be provided to the energy storage device 305 through the charger 350. The capacitor 360 may act as a filter capacitor during receive mode. The capacitor 360 and the charger 350 may be configured to further smooth the DC signal and set it to an appropriate DC voltage as a power output for use by the load 215 (FIG. 2). As discussed above, the load 215 may include system components such that the rectified voltage ($V_{RECT}$) is used to provide system power for the wireless power enabled device 210. The load 215 may also include an energy storage device 305 (e.g., battery) such that the rectified voltage ($V_{RECT}$) is used to provide the charging power for the energy storage device 305. Some embodiments may utilize the rectified voltage ($V_{RECT}$) to provide both system power and charging power simultaneously. The wireless charging transceiver 212 may be disconnected from receiving power from the energy storage device 305 and the adaptor 340 by opening the sixth switch 336, and the fifth switch 335, respectively.

The embodiments shown in FIG. 2, as well as in FIGS. 3A through 3D, are shown to demonstrate a wireless power enabled device being configured to operate in either a transmit mode or a receive mode, such as for wireless OTG charging. It should be recognized that the wireless power enabled device may include additional components to perform other features not specifically described herein. For example, the wireless power enabled device may include a modulator and/or a demodulator for communicating with other devices, foreign object detection modules, I/O modules for interfacing with a user, memory for storing instructions and data, various sensors, among other components.

Figure 4:
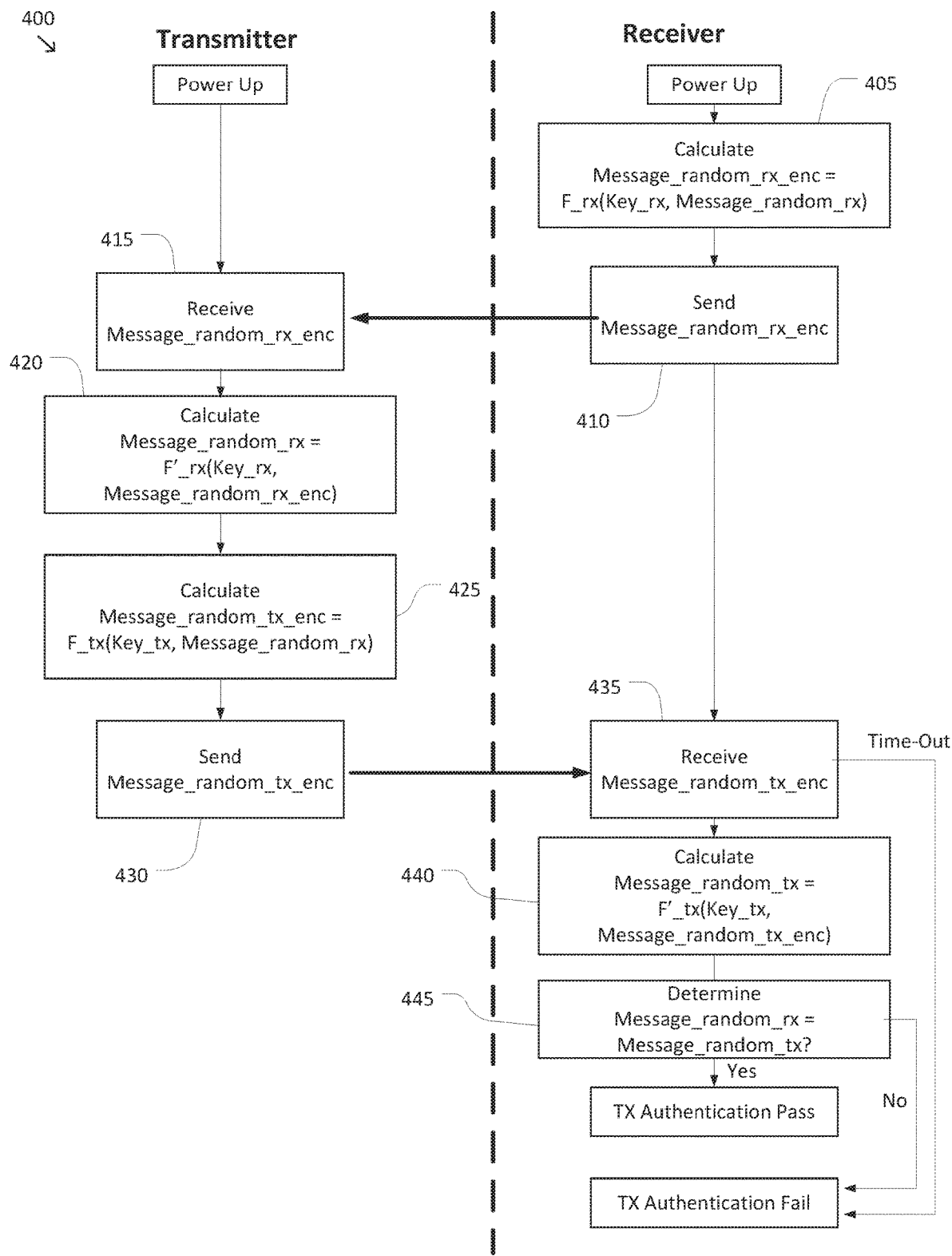
FIGS. 4 and 5 illustrate flow charts illustrating methods for authenticating a wireless power enabled device according to some examples.

FIG. 4 illustrates a method 400 for authenticating a wireless power enabled device according to some examples. According to some embodiments consistent with FIGS. 1-3, method 400 may be used to establish a trusted relationship between wireless power enabled devices 210 and 220 based on the first and second keys. In some examples, method 400 may be performed before, during, and/or after determining which of wireless power enabled devices 210 and 220 is in the transmit mode and which is in the receive mode. For illustrative purposes, FIG. 4 labels the transmitter and receiver as corresponding to the left column and right column, respectively. However, it is to be understood that method 400 may be performed prior to determining the respective modes of operation of the wireless power enabled devices.

At a process 405, the receiver generates an encrypted message (message_random_rx_enc) based on a stored key (key_rx) and a random value (message_random_rx) (message_random_rx_enc=F_rx(key_rx, message_random_rx). In some examples consistent with FIG. 2, the key_rx may correspond to key 230a of wireless power enabled device 210. Accordingly, key_rx may be a binary vector with N elements that is retrieved from secure storage. Similarly, message_random_rx may be a binary vector with N elements that is randomly and/or pseudorandomly generated using a random number generator, such as random number generator module 234 and/or 244. In some examples, message_random_rx may be regenerated at each performance of process 405. The receiver generates message_random_rx_enc by inputting key_rx and message_random_rx into a function (F_rx(x,y)) that operates on vectors (x and y). For example, F_rx(x,y) may implement an element-wise xor operation.

At a process 410, the receiver sends the encrypted message (message_random_rx_enc) to the transmitter. In some examples, the receiver may send message_random_rx_enc by modulating the wireless power signal received from the transmitter. Consistent with such embodiments, the receiver may modulate the load, such as load 215, to encode information in the received wireless power signal. In some examples, various other data communication techniques may be used, including wireless techniques (e.g., Bluetooth) and/or wired techniques.

At a process 415, the transmitter receives the encrypted message (message_random_rx_enc) from the receiver. In some examples, when the receiver sends message_random_rx_enc using load modulation to encode message_random_rx_enc in the wireless power signal, the transmitter may demodulate the transmitted wireless power signal by detecting variations in the receiver load.

At a process 420, the transmitter decrypts the encrypted message (message_random_rx_enc). In some examples, the transmitter may decrypt message_random_rx_enc using an inverse function (F'_rx(x,y)) which is the inverse of the function (F_rx(x,y)) used to encrypt message_random_rx_enc (message_random_rx=F'$_{13}$ rx, (key_rx, message_random_rx_enc). For example, when F_rx(x,y) is an element-wise xor operation, the inverse of F_rx(x,y) is also the element-wise xor operation. The transmitter decrypts message_random_rx_enc using a copy of key (key_ex) retrieved from the transmitter's secure storage, such as key 230b. When the transmitter has a valid copy of key_rx, the output of F'_rx(x,y) is the original random value (message_random_rx) generated by the receiver.

At a process 425, the transmitter generates an encrypted message (message_random_tx_enc) based on a stored key (key_tx) and the random value received from the receiver (message_random_rx) (message_random_tx_enc=F_tx(key_tx, message_random_rx). In general, process 425 mirrors process 405 for generating message_random_rx_enc. In some examples consistent with FIG. 2, key_tx may correspond to key 240a of wireless power enabled device 220. Accordingly, key_tx may be a binary vector with N elements that is retrieved from secure storage. The transmitter generates message_random_tx_enc by inputting key_tx and message_random_rx into a function (F_tx(x,y)) that operates on vectors (x and y). For example, F_tx(x,y) may implement an element-wise xor operation. F_tx(x,y) may or may not implement the same function as F_rx(x,y).

At a process 430, the transmitter sends the encrypted message (message_random_tx_enc) to the receiver. In some examples, the transmitter may send message_random_tx_enc by modulating the wireless power signal transmitted to the receiver. Consistent with such embodiments, the transmitter may use frequency modulation to encode information in the transmitted power signal. In some examples, various other data communication techniques may be used, including wireless techniques (e.g., Bluetooth) and/or wired techniques.

At a process 435, the receiver receives the encrypted message (message_random_tx_enc) from the transmitter. In some examples, when the transmitter sends message_random_tx_enc using frequency modulation to encode message_random_tx_enc in the wireless power signal, the receiver may demodulate the received wireless power signal by detecting frequency variations. According to some embodiments, when the receiver does not receive message_random_tx_enc from the transmitter within a predetermined time limit, a time-out error is generated and the authentication fails.

At a process 440, the receiver decrypts the encrypted message (message_random_tx_enc). In some examples, the receiver may decrypt message_random_tx_enc using an inverse function (F'_tx(x,y)) which is the inverse of the function (F_tx(x,y)) used to encrypt message_random_tx_enc (message_random_tx=F'_tx(key_tx, message_random_tx_enc). For example, when F_tx(x,y) is an element-wise xor operation, the inverse of F_tx(x,y) is also the element-wise xor operation. The receiver decrypts message_random_tx_enc using a copy of the key (key_tx) retrieved from the receiver's secure storage, such as key 240b.

At a process 445, the receiver determines whether the output of process 435 (message_random_tx) matches the original random value (message_random_rx). When the transmitter and receiver each have matching copies of key_rx and key_tx, message_random_tx matches message_random_rx. Accordingly, when the receiver determines that message_random_tx matches message_random_rx, the authentication passes and the receiver establishes that the transmitter is trusted. However, when the receiver determines that message_random_tx does not match message_random_rx, the authentication fails. In some examples, the receiver may return to process 405 and/or 410 when the authentication fails to perform one or more retry attempts. In some examples, such as when a predetermined number of retry attempts have failed, the receiver may terminate data communication and/or wireless power transfer between the transmitter and receiver.

Figure 5:
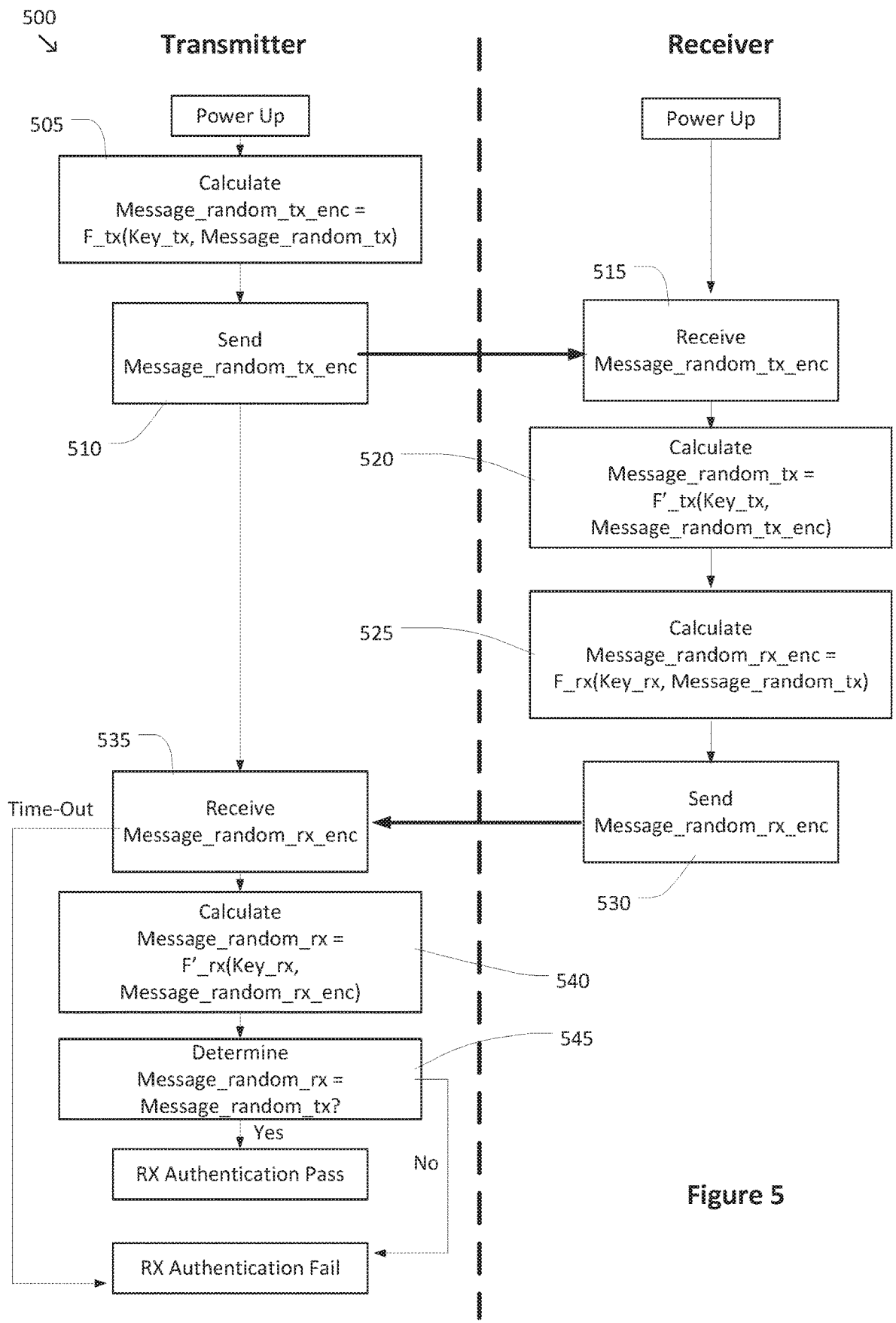

FIG. 5 illustrates a method 500 for authentication of a wireless power enabled device according to some examples. Method 500 includes a sequence of processes 505-545 that generally correspond to similarly labeled processes 405-445 of method 400. However, whereas in method 400 the receiver authenticates the transmitter, in method 500 the transmitter authenticates the receiver. In some examples, method 500 may be performed before, during, and/or after method 400 to establish mutual authentication between the transmitter and receiver. In some examples, one or more processes of method 500 may be interleaved and/or performed concurrently with the one or more processes of method 400.

As illustrated in FIG. 5, at a process 505, the transmitter generates an encrypted message (message_random_tx_enc) based on a stored key (key_tx) and a random value (message_random_tx) (message_random_tx_enc=F_tx(key_tx, message_random_tx). In some examples consistent with FIG. 2, the key_tx may correspond to key 230a or key 230b of wireless power enabled device 210. Accordingly, key_tx may be a binary vector with N elements that is retrieved from secure storage. Similarly, message_random_tx may be a binary vector with N elements that is randomly and/or pseudorandomly generated using a random number generator, such as random number generator module 234 and/or 244. In some examples, message_random_tx may be regenerated at each performance of process 505. The transmitter generates message_random_tx_enc by inputting key_tx and message_random_tx into a function (F_tx(x,y)) that operates on vectors (x and y). For example, F_tx(x,y) may implement an element-wise xor operation.

At a process 510, the transmitter sends the encrypted message (message_random_tx_enc) to the receiver. In some examples, the transmitter may send message_random_tx_enc by modulating the wireless power signal transmitted to the receiver. Consistent with such embodiments, the transmitter may modulate the load, such as load 215 or load 225 to encode information in the transmitted wireless power signal. In some examples, various other data communication techniques may be used, including wireless techniques (e.g., Bluetooth) and/or wired techniques.

At a process 515, the receiver receives the encrypted message (message_random_tx_enc) from the transmitter. In some examples, when the transmitter sends message_random_tx_enc using load modulation to encode message_random_tx_enc in the wireless power signal, the receiver may demodulate the transmitted wireless power signal by detecting variations in the transmitted wireless power.

At a process 520, the receiver decrypts the encrypted message (message_random_tx_enc). In some examples, the transmitter may decrypt message_random_tx_enc using an inverse function (F'_tx(x,y)) which is the inverse of the function (F_tx(x,y)) used to encrypt message_random_tx_enc (message_random_tx=F'_tx(key_tx, message_random_tx_enc). For example, when F_tx(x,y) is an element-wise xor operation, the inverse of F_tx(x,y), F'_tx(x,y), is also the element-wise xor operation. The receiver decrypts message_random_tx_enc using a copy of key (key_tx) retrieved from the receiver's secure storage, such as key 230b. When the receiver has a valid copy of key_tx, the output of F'_tx(x,y) is the original random value (message_random_tx) generated by the transmitter.

At a process 525, the receiver generates an encrypted message (message_random_rx_enc) based on a stored key (key_Tx) and the random value received from the transmitter (message_random_tx) (message_random_rx_enc=F_rx(Key_rx, message_random_rx). In general, process 525 mirrors process 505 for generating message_random_tx_enc. In some examples consistent with FIG. 2, key_rx may correspond to key 240a or key 240b of wireless power enabled device 220. Accordingly, key_rx may be a binary vector with N elements that is retrieved from secure storage. The transmitter generates message_random_rx_enc by inputting key_rx and message_random_tx into function (F_rx(x,y)) that operates on vectors (x and y). For example, F_rx(x,y) may implement an element-wise xor operation. F_rx(x,y) may or may not implement the same function as F_tx(x,y).

At a process 530, the receiver sends the encrypted message (message_random_rx_enc) to the transmitter. In some examples, the receiver may send message_random_rx_enc by modulating the wireless power signal transmitted to the transmitter, for example by modulating load 215 or load 225. Consistent with such embodiments, the receiver may use frequency modulation to encode information in the transmitted power signal. In some examples, various other data communication techniques may be used, including wireless techniques (e.g., Bluetooth) and/or wired techniques.

At a process 535, the transmitter receives the encrypted message (message_random_rx_enc) from the receiver. In some examples, when the receiver sends message_random_rx_enc using frequency modulation to encode message_random_rx_enc in the wireless power signal, the transmitter may demodulate the received wireless power signal by detecting frequency variations. According to some embodiments, when the transmitter does not receive message_random_rx_enc from the receiver within a predetermined time limit, a time-out error is generated and the authentication fails.

At a process 540, the transmitter decrypts the encrypted message (message_random_rx_enc). In some examples, the transmitter may decrypt message_random_rx_enc using an inverse function (F'_rx(x,y)) which is the inverse of the function (F_rx(x,y)) used to encrypt message_random_rx_enc (message_random_rx=F'_rx(key_rx, message_random_rx_enc). For example, when F_rx(x,y) is an element-wise xor operation, the inverse of F_rx(x,y) is also the element-wise xor operation. The receiver decrypts message_random_rx_enc using a copy of the key (key_Tx) retrieved from the receiver's secure storage, such as key 240a or 240b.

At a process 545, the transmitter determines whether the output of process 535 (message_random_rx) matches the original random value (message_random_tx). When the transmitter and receiver each have matching copies of key_rx and key_tx, message_random_tx matches message_random_rx. Accordingly, when the transmitter determines that message_random_tx matches message_random_rx, the authentication passes and the transmitter establishes that the receiver is trusted. However, when the transmitter determines that message_random_tx does not match message_random_rx, the authentication fails. In some examples, the transmitter may return to process 505 and/or 510 when the authentication fails to perform one or more retry attempts. In some examples, such as when a predetermined number of retry attempts have failed, the transmitter may terminate data communication and/or wireless power transfer between the transmitter and receiver.

Figure 6:
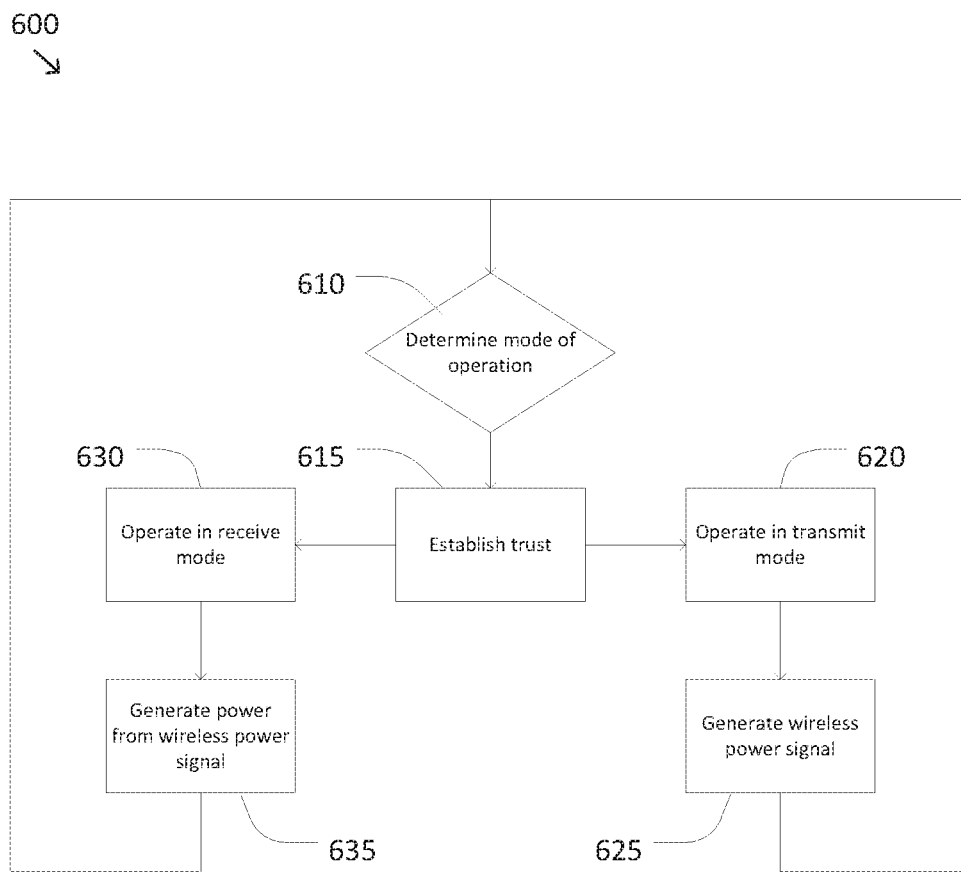
FIG. 6 is a flow chart illustrating a method for operating a wireless power enabled device according to some embodiments.

FIG. 6 is a flow chart 600 illustrating a method for operating a wireless power enabled device according to some embodiments of the present disclosure. At operation 610, the mode of operation for the wireless power enabled device may be determined. For example, the wireless power enabled device may be configured to have a transmit mode and a receive mode. In some embodiments, the determination of which mode of operation is desired at a given time may be determined manually by a user. For example, the wireless power enabled device may include a software application or other feature (e.g., switch) for the user to interface with for the user to select which mode of operation is to be used for the wireless power enabled device. In some embodiments, the wireless power enabled device may automatically make the determination regarding the desired mode of operation. For example, the wireless power enabled device may detect an incoming wireless power signal and automatically enter a receive mode for receiving that wireless power signal. In some embodiments, the wireless power enabled device may make the determination based on communication with another device. For example, the wireless power enabled device may receive communication data from another device with instructions on which mode of operation the wireless power enabled device is desired for operation.

At operation 615, trust is established between the wireless power enabled device and another device with which wireless power transfer is contemplated. Trust may be established via one-way and/or mutual authentication. In some examples consistent with FIGS. 4-5, trust may be established using methods 400 and/or 500. Operation 615 may be performed before, during, and/or after determining the mode of operation at operation 610. For example, trust may be established prior to determining the mode of operation to ensure that the mode of operation is determined fairly and/or according to a known protocol. Similarly, trust may be established prior to determining the mode of operation to ensure that private information, such as battery charge state information, is not shared with an untrusted device when determining the mode of operation. In some examples, trust may be established during the determination of the operating mode. For example, a condition of the trusted relationship may include that the wireless power enabled device is authorized to operate only in the receive mode (and/or only in the transmit mode) with respect to another device. In some examples, trust may be established after determining the mode of operation to ensure that the wireless power enabled device is authorized to operate in the determined mode with respect to the other device and/or that the other device is authorized to operate in the determined mode with respect to the wireless power enabled device.

If the transmit mode is determined to be the desired mode of operation, the wireless power device operates in the transmit mode at operation 620. While in transmit mode, control logic may transmit control signals to a wireless charging transceiver. The control signals may control operation of a full-bridge circuit coupled with a resonant tank of the wireless charging transceiver to operate as a full-bridge inverter. The wireless charging transceiver operating as a full-bridge inverter receives a DC input signal and generates an AC current through the resonant tank. Therefore, at operation 625, the wireless power signal may be generated for energy transfer to a wireless power receiving device. The wireless power receiving apparatus may be an electronic device that is configured to receive the wireless power signal. In some embodiments, the wireless power receiving apparatus may likewise be a wireless power enabled device having multiple modes of operation.

If the receive mode is determined to be the desired mode of operation, the wireless power enabled operates in the receive mode at operation 630. While in receive mode, control logic may transmit control signals to the wireless charging transceiver. The control signals may control operation of the full-bridge circuit coupled with the resonant tank of the wireless charging transceiver to operate as a full-bridge rectifier. The wireless charging transceiver may receive an incoming wireless power signal and generate an AC current through the resonant tank through inductive coupling. The incoming wireless power signal may be generated by a wireless power transmitting apparatus, such as a wireless power charger. In some embodiments, the wireless power transmitting apparatus may likewise be a wireless power enabled device having multiple modes of operation.

The wireless charging transceiver operating as a full-bridge rectifier receives the AC current generated by the resonant tank generates a DC current to be output to a load. Therefore, at operation 635, power may be generated from the energy transfer to provide power to a load. For example, the load may include an energy storage device (e.g., battery), system components of the wireless power enabled device, or other power consuming devices.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A first wireless power enabled device, comprising:
   a transceiver including a plurality of switches coupled in a full-bridge configuration with a resonant tank circuit;
   a key storage configured to store two or more keys, the two or more keys including a first key associated with the first wireless power enabled device and a second key associated with a second wireless power enabled device; and
   control logic configured to:
      detect a presence of the second wireless power enabled device;
      attempt to establish a trusted relationship with the second wireless power enabled device by exchanging encrypted messages based on the first key, the second key, and one or more random numbers generated in each of the first wireless power enabled device and the second wireless power enabled device, wherein the trusted relationship is established when it is confirmed by both the first wireless power enabled device and the second wireless power related device that both the first wireless power enabled device and the second wireless power enabled device possesses both the first key and the second key that are stored in the key storage;
      if the attempt to establish the trusted relationship fails, discontinue communications and power transfer; and
      if the attempt to establish the trusted relationship succeeds, determine an operating mode of the first wireless power enabled device, the operating mode being selected from a transmit mode or a receive mode and drive the plurality of switches to operate the resonant tank circuit in the determined operating mode.

2. The first wireless power enabled device of claim 1, wherein the control logic is configured to establish the trusted relationship prior to determining the operating mode.

3. The first wireless power enabled device of claim 1, wherein the control logic is configured to establish the trusted relationship after determining the operating mode and prior to driving the plurality of switches.

4. The first wireless power enabled device of claim 1, wherein the key storage includes a memory that stores a copy of a first key associated with the first wireless power enabled device and a copy of a second key associated with the second wireless power enabled device.

5. The first wireless power enabled device of claim 4, wherein the copy of the first key and the copy of the second key are stored securely.

6. The first wireless power enabled device of claim 4, wherein the memory stores copies of one or more additional keys associated with other devices with which trusted relationships can be established.

7. The first wireless power enabled device of claim 4, wherein the first key and the second key include binary vectors with N elements each.

8. The first wireless power enabled device of claim 7, wherein the binary vectors are randomly generated.

9. The first wireless power enabled device of claim 1, further comprising a random number generator that provides one or more random numbers to the control logic when establishing the trusted relationship.

10. The first wireless power enabled device of claim 1, wherein the control logic is further configured to verify that the second wireless power enabled device is a member of a shared charging pool of devices based on the trusted relationship.

11. The first wireless power enabled device of claim 1, wherein the control logic is further configured to determine the operating mode based on information associated with the trusted relationship.

12. A method comprising:
   determining an operating mode of a first wireless power enabled device that includes a plurality of switches coupled in a full-bridge configuration with a resonant tank circuit, wherein the operating mode is selected from a receive mode and a transmit mode;
   attempting to establish a trusted relationship between the first wireless power enabled device and a second wireless power enabled device by exchanging encrypted messages based on one or more random numbers generated by a random number generator and a first key associated with the first wireless power enabled device and a second key associated with the second wireless power enabled device, the trusted relationship being established upon confirmation by both the first wireless power enabled device and the second wireless power related device that both the first key and the second key are stored in both of the first wireless power enabled device and the second wireless power enabled device;

if the trusted relationship is not established, discontinuing communications and power transfer; and if the trusted relationship is established and the determined operating mode is the transmit mode, driving the plurality of switches to generate a wireless power signal that transmits power to the second wireless power enabled device.

13. The method of claim 12, wherein establishing the trusted relationship with the second wireless power enabled device comprises:

generating a first message;

encrypting the first message with the first key to generate a first encrypted message;

sending the first encrypted message to the second wireless power enabled device;

receiving a second encrypted message from the second wireless power enabled device;

decrypting the second encrypted message with the second key to generate a second message;

determining whether the first and second messages match; and when the first and second messages match, determining that the authentication passed and establishing the trusted relationship.

14. The method of claim 13, wherein generating the first message includes generating a random binary value with N elements, where N is an integer.

15. The method of claim 14, wherein encrypting the first message includes computing a first function using the random value and the first key as inputs, where the first key is a binary vector with N elements.

16. The method of claim 15, wherein decrypting the second encrypted message includes computing a second function using the second encrypted message and the second key as inputs, where the second key is a binary vector with N elements that is different from the first key, and wherein the second function is an inverse function of a third function used by the second wireless power enabled device to generate the second encrypted message.

17. The method of claim 13, wherein sending the first encrypted message includes modulating a wireless power signal that is used to transfer power between the first and second wireless power enabled devices.

18. The method of claim 13, further comprising:

receiving a third encrypted message from the second wireless power enabled device;

decrypting the third encrypted message to generate a third message;

encrypting the third message to generate a fourth encrypted message; and sending the fourth encrypted message to the second wireless power enabled device.

19. A first wireless power enabled device comprising:

a transceiver including a plurality of switches coupled in a full-bridge configuration with a resonant tank circuit;

a secure storage that includes copies of two or more digital keys, the two or more digital keys including a first key associated with the first wireless power enabled device and a second key associated with a second wireless power enabled device; and control logic configured to:

detect a presence of the second wireless power enabled device;

attempt to establish a trusted relationship with the second wireless power enabled device by exchanging encrypted messages based on the two or more digital keys and one or more random numbers generated in one or more of the first wireless power enabled device and the second wireless power enabled device, wherein the trusted relationship is established when it is confirmed by both the first wireless power enabled device and the second wireless power related device that the first key and the second key are stored in both the first wireless power enabled device and the second wireless power enabled device;

if the attempt to establish the trusted relationship fails, discontinue communications and power transfer; and if the trusted relationship is established, negotiate with the second wireless power enabled device to determine an operating mode of the first wireless power enabled device, the operating mode being selected from a transmit mode or a receive mode; and mode, and drive the plurality of switches to operate the resonant tank circuit in the determined operating mode.

* * * * *